United States Patent
Hole et al.

(10) Patent No.: US 8,903,443 B2
(45) Date of Patent: Dec. 2, 2014

(54) METHODS AND SYSTEMS FOR SLOW ASSOCIATED CONTROL CHANNEL SIGNALING

(71) Applicant: Research In Motion Limited, Waterloo (CA)

(72) Inventors: David Philip Hole, Southampton (GB); Eswar Kalyan Vutukuri, Hedge End (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/791,219

(22) Filed: Mar. 8, 2013

(65) Prior Publication Data

US 2013/0195269 A1    Aug. 1, 2013

Related U.S. Application Data

(63) Continuation of application No. 13/427,290, filed on Mar. 22, 2012, now Pat. No. 8,412,250, which is a continuation of application No. 13/244,740, filed on Sep. 26, 2011, now Pat. No. 8,165,618.

(60) Provisional application No. 61/446,488, filed on Feb. 24, 2011.

(51) Int. Cl.
*H04B 7/00*   (2006.01)
(Continued)

(52) U.S. Cl.
CPC .................. *H04W 12/02* (2013.01); *H04L 9/12* (2013.01); *H04W 12/00* (2013.01);
(Continued)

(58) Field of Classification Search
CPC . H04L 2209/80; H04L 9/0618; H04L 9/0637; H04B 7/18565; H04B 7/18532; H04B 7/18558; G06F 21/602; H04W 12/02; H04W 12/04; H04W 12/06; H04W 88/02; H04W 12/00

USPC ................. 455/410, 411, 466, 502, 509, 515; 380/247, 270, 287
See application file for complete search history.

(56) References Cited

U.S. PATENT DOCUMENTS 5,060,266 A    10/1991 Dent
5,199,031 A *  3/1993 Dahlin ......................... 370/329
(Continued)

FOREIGN PATENT DOCUMENTS

| EP | 2493145 | 8/2012 |
|---|---|---|
| WO | 2009090432 | 7/2009 |
| WO | 2012113817 | 8/2012 |

OTHER PUBLICATIONS

EPO, "Extended European Search Report," issued in connection with European Application No. 12156465.2, on May 24, 2012 (10 pages).

(Continued)

*Primary Examiner* — Olumide T Ajibade Akonai
(74) *Attorney, Agent, or Firm* — Hanley, Flight & Zimmerman, LLC

(57) ABSTRACT

Methods and systems for slow associated control channel signaling are disclosed. An example method for securing communications in a mobile network disclosed herein comprises transmitting a first variant of a message of a first type on a first slow associated control channel (SACCH) before ciphering is started on the first SACCH, and after ciphering is started on the first SACCH, transmitting a second variant of the message of the first type on the first SACCH, and subsequently transmitting the second variant of the message of the first type on the first SACCH, wherein the subsequently transmitted second variant of the message of the first type is the next transmitted message of the first type on the first SACCH.

17 Claims, 11 Drawing Sheets

(51) Int. Cl.
*H04W 12/02* (2009.01)
*H04W 12/00* (2009.01)
*H04L 9/12* (2006.01)
*H04L 9/06* (2006.01)
*H04B 7/185* (2006.01)
*H04W 12/06* (2009.01)

(52) U.S. Cl.
CPC ........... *H04L 9/0618* (2013.01); *H04B 7/18565* (2013.01); *H04W 12/06* (2013.01); *H04B 7/18532* (2013.01)
USPC ........... 455/515; 455/410; 455/411; 380/247; 380/270; 380/287

(56) References Cited

U.S. PATENT DOCUMENTS

| | | | |
|---|---|---|---|
| 5,594,798 A * | 1/1997 | Cox et al. | 380/257 |
| 6,081,600 A * | 6/2000 | Blanchard et al. | 380/255 |
| 6,813,355 B1 * | 11/2004 | Hakaste | 380/270 |
| 7,240,270 B2 | 7/2007 | Bellier et al. | |
| 7,593,368 B2 | 9/2009 | Zeng et al. | |
| 7,596,126 B2 | 9/2009 | Riddington et al. | |
| 7,620,013 B2 | 11/2009 | Zeng et al. | |
| 7,693,531 B2 | 4/2010 | Heiman | |
| 7,730,385 B2 | 6/2010 | Smolinske et al. | |
| 7,969,936 B2 | 6/2011 | Bellier et al. | |
| 8,009,826 B2 | 8/2011 | Barkan et al. | |
| 8,046,662 B2 | 10/2011 | Heiman et al. | |
| 8,165,618 B1 | 4/2012 | Hole et al. | |
| 8,588,426 B2 * | 11/2013 | Xin et al. | 380/287 |
| 2002/0023209 A1 * | 2/2002 | Domstedt et al. | 713/160 |
| 2010/0067440 A1 | 3/2010 | Dick et al. | |
| 2011/0051660 A1 | 3/2011 | Arora et al. | |
| 2011/0053588 A1 | 3/2011 | Al-Khudairi et al. | |
| 2011/0105168 A1 | 5/2011 | McDonald et al. | |
| 2011/0205947 A1 | 8/2011 | Xin et al. | |
| 2012/0093314 A1 | 4/2012 | Jokinen et al. | |
| 2012/0220287 A1 | 8/2012 | Hole et al. | |

OTHER PUBLICATIONS

IB, "International Search Report and Written Opinion," issued in connection with PCT Application No. PCT/EP2012/052983, on May 24, 2012 (13 pages).
USPTO, "Notice of Allowance," issued in connection with U.S. Appl. No. 13/244,740, on Dec. 30, 2011 (16 pages).
USPTO, "Office Action," issued in connection with U.S. Appl. No. 13/427,290, dated Apr. 27, 2012 (9 pages).
USPTO, "Notice of Allowance," issued in connection with U.S. Appl. No. 13/427,290, dated Dec. 5, 2012 (9 pages).
3GPP, "Technical Specification Group Services and System Aspects; Security Related Network Features," Technical Specification 43.020 V9.1.0, Dec. 18, 2009 (110 pages).
Vodafone, "Change Request: Alternating between different neighbour cell description formats, etc," GP-101242, 3GPP TSG-GERAN Meeting #47, Kunming, China, Aug. 30-Sep. 3, 2010 (6 pages).
Geran WG2, "LS on SACCH Security (Release 10)," G2-100389, 3GPP TSG Geran WG2, Meeting #47bis, Vienna, Austria, Oct. 19-22, 2010 (2 pages).
Nokia Corporation, "On Removing SACCH Ciphering," GP-I01787, 3GPP TSG Geran Meeting #48, San Jose del Cabo, Mexico, Nov. 22-26, 2010 (4 pages).
Vodafone, "Change Request: Alternating Between Different Neighbour Cell Description Formats," GP-II0754, 3GPP TSG-GERAN Meeting #50, Dallas, TX, USA, May 17-19, 2011 (9 pages).
Telefon AB LM Ericsson, "Alternative Solution for SACCH Security," GP-11398, 3GPP TSG GERAN Meeting #51, Gothenburg, Sweden, Aug. 29-Sep. 2, 2011 (7 pages).
Vodafone, "Additional A5/1-GEA1 Attack Countermeasures," 3GPP GP-101243, Aug. 30, 2010 to Sep. 3, 2010 (7 pages).
European Patent Office, "Intention to Grant", issued in connection with European Patent Application No. 12156465.2, dated Jul. 9, 2014 (54 pages).
IP Australia, "Examination Report", issued in connection with Australian Patent Application No. 2012219636, dated Sep. 16, 2014 (3 pages).

* cited by examiner

METHODS AND SYSTEMS FOR SLOW ASSOCIATED CONTROL CHANNEL SIGNALING

RELATED APPLICATION(S)

This patent arises from a continuation of U.S. patent application Ser. No. 13/427,290 (now U.S. Pat. No. 8,412,250), entitled "Methods and Systems for Slow Associated Control Channel Signaling" and filed on Mar. 22, 2012, which is a continuation of U.S. patent application Ser. No. 13/244,740 (now U.S. Pat. No. 8,165,618), entitled "Methods and Systems for Slow Associated Control Channel Signaling" and filed on Sep. 26, 2011, which claims priority from U.S. Provisional Application Ser. No. 61/446,488, entitled "Method and System for Slow Associated Control Channel Signaling" and filed on Feb. 24, 2011. U.S. patent application Ser. No. 13/427,290, U.S. patent application Ser. No. 13/244,740 and U.S. Provisional Application Ser. No. 61/446,488 are hereby incorporated by reference in their respective entireties.

FIELD OF THE DISCLOSURE

The present disclosure relates to security for mobile communications and in one aspect relates to transmission of information on the slow associated control channel (SACCH) of the global system for mobile communications (GSM).

BACKGROUND

GSM supports a number of different encryption techniques to cipher the data at layer 1 on the radio interface. These encryption techniques are known as A5/1, A5/3 and A5/4, in accordance with the Third Generation Partnership Project (3GPP), "*Technical Specification Group Services and System Aspects; Security Related Network Features*", Technical Specification 43.020 V9.1.0, 2009-12-18, the contents of which are incorporated herein by reference.

A5/1 encryption is the most commonly used encryption technique for GSM, and support for A5/1 is mandatory for all GSM mobile devices since GSM Release-1999. A5/3 and A5/4 are more robust encryption algorithms, which have been specified more recently by 3GPP and are not yet widely supported among mobile devices or networks currently in operation.

Physical layer (Layer 1) security in GSM using the A5/1 cipher is vulnerable to being broken, and the exploitation of the vulnerability has been shown by researchers to be practical through a "known plain text" attack on GSM speech calls utilizing the A5/1 cipher.

A known plain text attack can be performed on an encryption algorithm when ciphered blocks of known text are available to an attacker. In case of GSM, during the speech call, signaling over the slow associated control channel (SACCH) is known to be vulnerable to known plain text attacks as the contents of the SACCH during the speech call constitute periodically repetitive and predictable information. In particular, the SACCH periodically transmits information specific to the neighbor cell configuration. The same information is also broadcast on the broadcast control channel (BCCH) of the cell in an unencrypted fashion and can be read by any mobile in the cell (and, hence, available to the attacker). Also, the information may be sent on the SACCH in an unencrypted format prior to the establishment of the ciphering operation.

The information specific to the neighbor cell configuration for a given cell is typically static and, therefore, typically does not change during the call. The system information (SI) messages transmitted over the SACCH carry the neighbor cell configuration information during the call. Ciphering of this "known" text in the system information messages sent on the SACCH renders the contents of the encrypted SACCH open to so-called known plain text attacks to obtain the cipher session key. In general, an issue associated with SACCH is the possibility that information transmitted ciphered on SACCH may be obtained from other (unciphered, or deciphered) sources, and that this information may be repeatedly transmitted on SACCH. Neighbor cell information is one such example.

BRIEF DESCRIPTION OF THE DRAWINGS

The present disclosure will be better understood with reference to the drawings, in which.

DETAILED DESCRIPTION OF THE DRAWINGS

The present methods and systems can be used as a deterrent for plain text attacks on any message which (or some or all of whose constituent contents) can be constructed in varying formats and that is encrypted. In one embodiment, the methods and systems relate to the variation in formatting (which may include pseudo-randomization) of SACCH block contents, the scheduling of such blocks, and the reception and decoding of such blocks to prevent known plain text attacks on the SACCH control messages.

Figure 1:
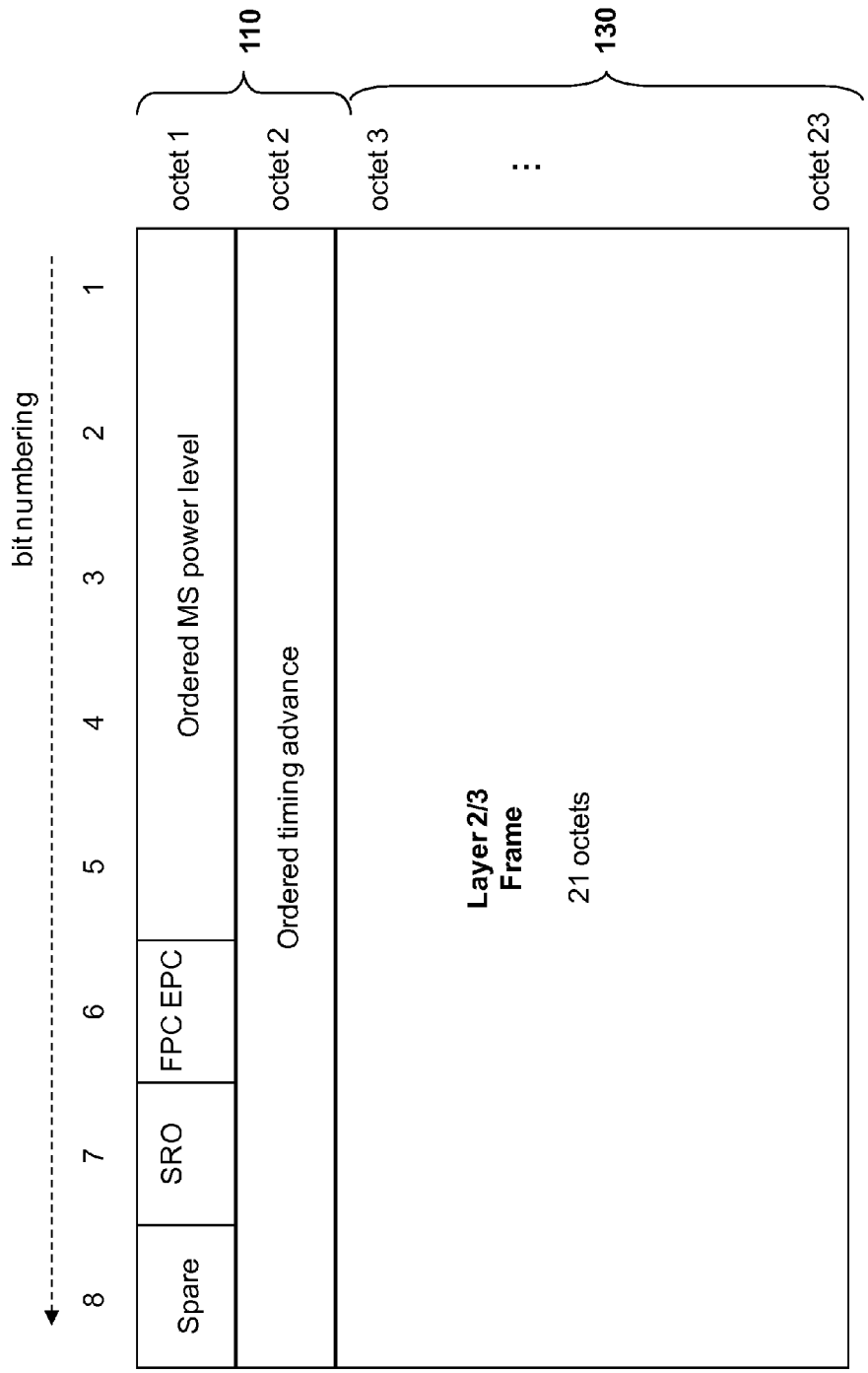
FIG. 1 is a block diagram showing a downlink SACCH message.

Reference is now made to FIG. 1. To provide context for the example SACCH signaling techniques disclosed herein, FIG. 1 shows a block diagram illustrating a 3GPP-compliant downlink SACCH message block.

The downlink SACCH message block comprises 23 bytes, of which the first 2 bytes, referred to herein as sub-block 110, are directed to layer 1 signaling while the remaining 21 bytes, referred to herein as sub-block 130, are directed to layer 2 or layer 3 signaling.

The SACCH message block 100 from FIG. 1 is transformed and encrypted for transmission. To provide further context for the example SACCH signaling techniques disclosed herein, reference is now made to FIG. 2 which shows a block diagram for 3GPP-compliant transformation, encryption and sending of a SACCH message.

Figure 2:
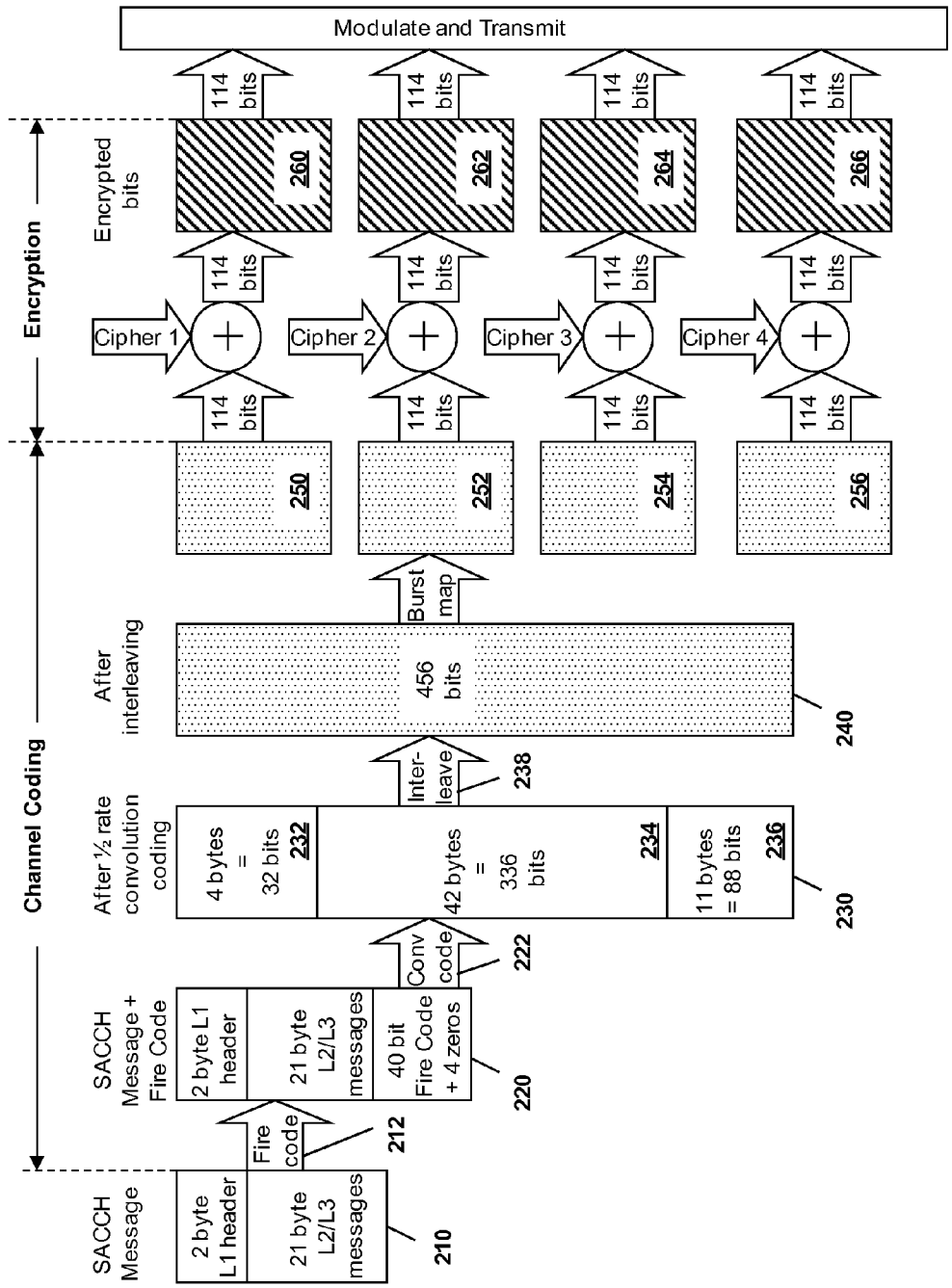
FIG. 2 is a block diagram showing the channel coding and encryption of a SACCH message.

Specifically, in FIG. 2, the original SACCH message 210 is comprised of a 2 byte layer 1 header and a 21 byte layer 2/layer 3 message, as seen above with regard to FIG. 1.

A fire code 212 is applied to SACCH message 210 to produce the message 220. As will be appreciated by those in the art, fire codes are binary cyclic codes designed principally for error detection and a fire code also provides limited error correction capabilities.

Message 220 includes the 2 byte layer 1 header, the 21 byte layer 2/layer 3 message and the 40 bit fire code block followed by a string of 4 zeros which act as the tail bits for convolution encoding. The 40 bits from the fire code are determined by the entire SACCH message content 210.

A convolution code 222 is applied to message 220 to produce message 230. In the embodiment of FIG. 2, convolution code 222 is a half rate convolution code, and is used for error correction.

The half rate convolution coding doubles the size of each of the elements of message 220. Thus, message 230 includes a 4 byte section 232 a 42 byte section 234, and an 11 byte section 236. This SACCH message block after convolution coding thus contains a total of 57 bytes.

An interleaving algorithm 238 is then applied to message 230 to produce message 240. As will be appreciated by those in the art, interleaving changes the order of the bits in message 230 in a predetermined fashion.

The 456 bits of message 240 are then divided into four, 114 bit, segments 250, 252, 254 and 256.

A cipher is then applied to each of bursts 250, 252, 254 and 256 to produce the encrypted bursts 260, 262, 264 and 266, respectively. The cipher applied relates to the encryption key along with a timing block given by the TDMA frame number.

Each of bursts 260, 262, 264, 266 is then modulated and transmitted to the mobile device, with 120 milliseconds between the sending of each burst.

An attack to break the cipher used to produce the encrypted bursts 260, 262, 264 and 266 may be based on the premise that some or all of the higher layer information which is included in ciphered SACCH blocks may be known and is transmitted repetitively. This may include the layer 1 header in SACCH control messages, since the contained information is repetitive by nature and seldom changes during the call. In particular, the power control and timing advance are slow varying content and may be known in advance to the attacker if he listens to some call setup messages. Other higher layer information, such as neighbor cell information, cell configurations and parameters, and network capabilities are also inherently unchanging. Often these values and other information (which may be subsequently transmitted ciphered on SACCH) are transmitted by the base station unencrypted over a different channel prior to the establishment of communications with a mobile device, or over the SACCH prior to ciphering being established. Such unencrypted transmission may enable an attacker to launch a successful attack when two identical copies of the SACCH message are received.

For example, from FIG. 2, the steps to obtain data bursts 250, 252, 254 and 256 are known. In particular, fire code 212, convolution code 222, and interleaving algorithm 238 are standardized and, therefore, do not provide any security.

Thus, if an attacker knows the contents of SACCH message 210, the attacker can replicate these steps to produce bursts 250, 252, 254 and 256.

Figure 3:
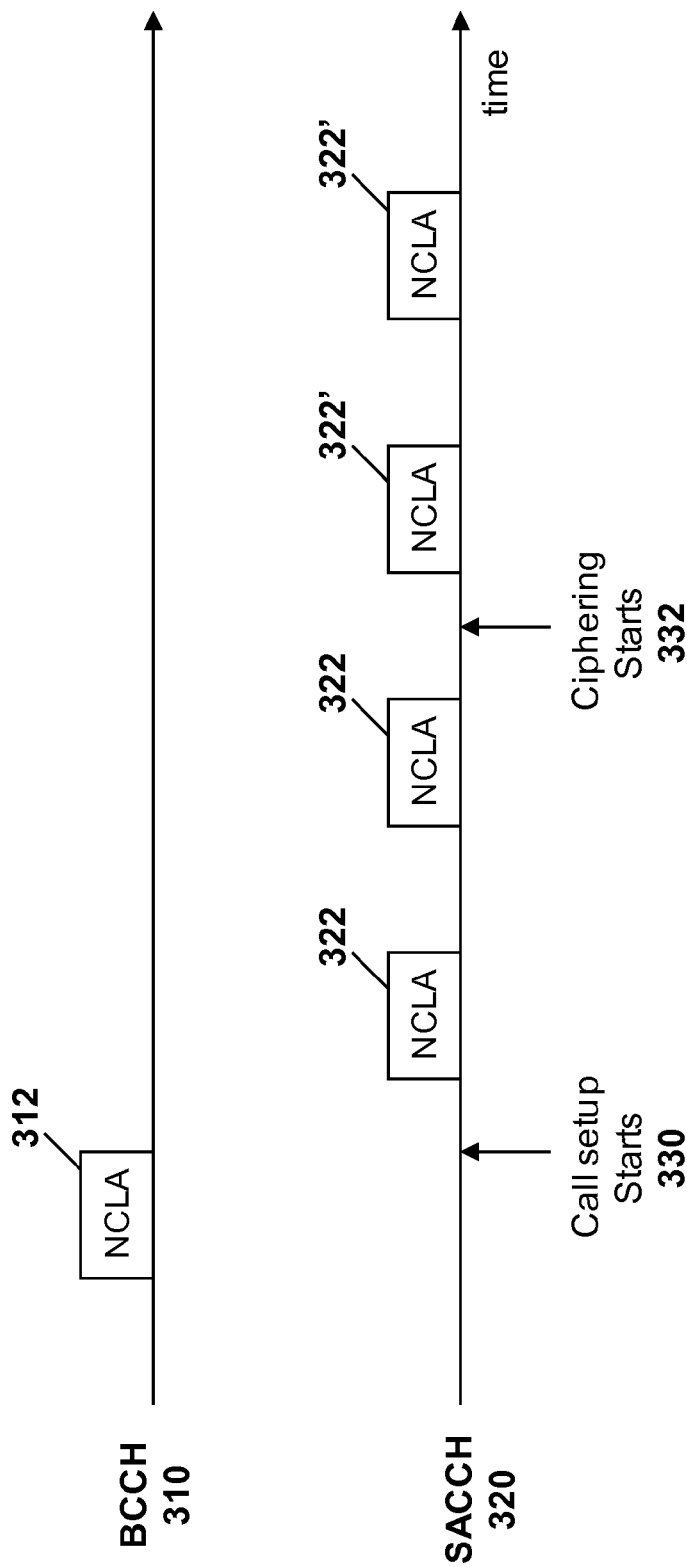
FIG. 3 is a block diagram illustrating the sending of neighbor cell information on a BCCH and SACCH.

To further illustrate the vulnerability of prior SACCH signaling to plain-text attacks, reference is now made to FIG. 3, which shows how neighbor cell information is transmitted in existing systems.

In FIG. 3, neighbor cell information is provided in a 3GPP-compliant manner both on a broadcast control channel (BCCH) 310 as well as on the slow associated control channel (SACCH) 320.

Turning to FIG. 3, BCCH 310 broadcasts neighboring cell information 312. Further, neighboring cell information 322 is sent on SACCH prior to ciphering and cell information 322' after cipher. Neighboring cell information 312 is related to neighboring cell information 322. The attacker knows that messages 322 and 322' are unciphered/ciphered versions of the same message and can use this to find the cipher key. It should be noted that although transmissions of unciphered SACCH blocks 322 are shown prior to the start of ciphering, depending on the call setup process, such SACCH blocks may not be transmitted prior to the start of ciphering.

On SACCH 320, the call setup starts at time 330 and the ciphering starts at time 332.

Thus, from FIG. 3, it is evident that the neighboring cell information is sent without encryption both in block 312 and possibly in block 322 prior to the ciphering start time 332.

Referring again to FIG. 2, the attacker can use the known data bursts 250, 252, 254 and/or 256 such as those constituting block 322 and the received encrypted bursts 260, 262, 264 and/or 266 such as those constituting block 322' to determine the encryption key used to cipher the bursts 250, 252, 254 or 256. Once the encryption key is determined, the encryption key can be used on the voice communications between the mobile device and base station to decrypt the voice communications.

In general, a problem that can be solved by the example disclosed techniques is that the entire plain text (i.e. message 240 from FIG. 2) of the SACCH block information is known in advance in prior systems and, thus, can be used by an attacker, relatively easily, to determine cipher keys or encryption keys to decipher encrypted GSM voice calls and/or SMS messages, among other communications.

Figure 4:
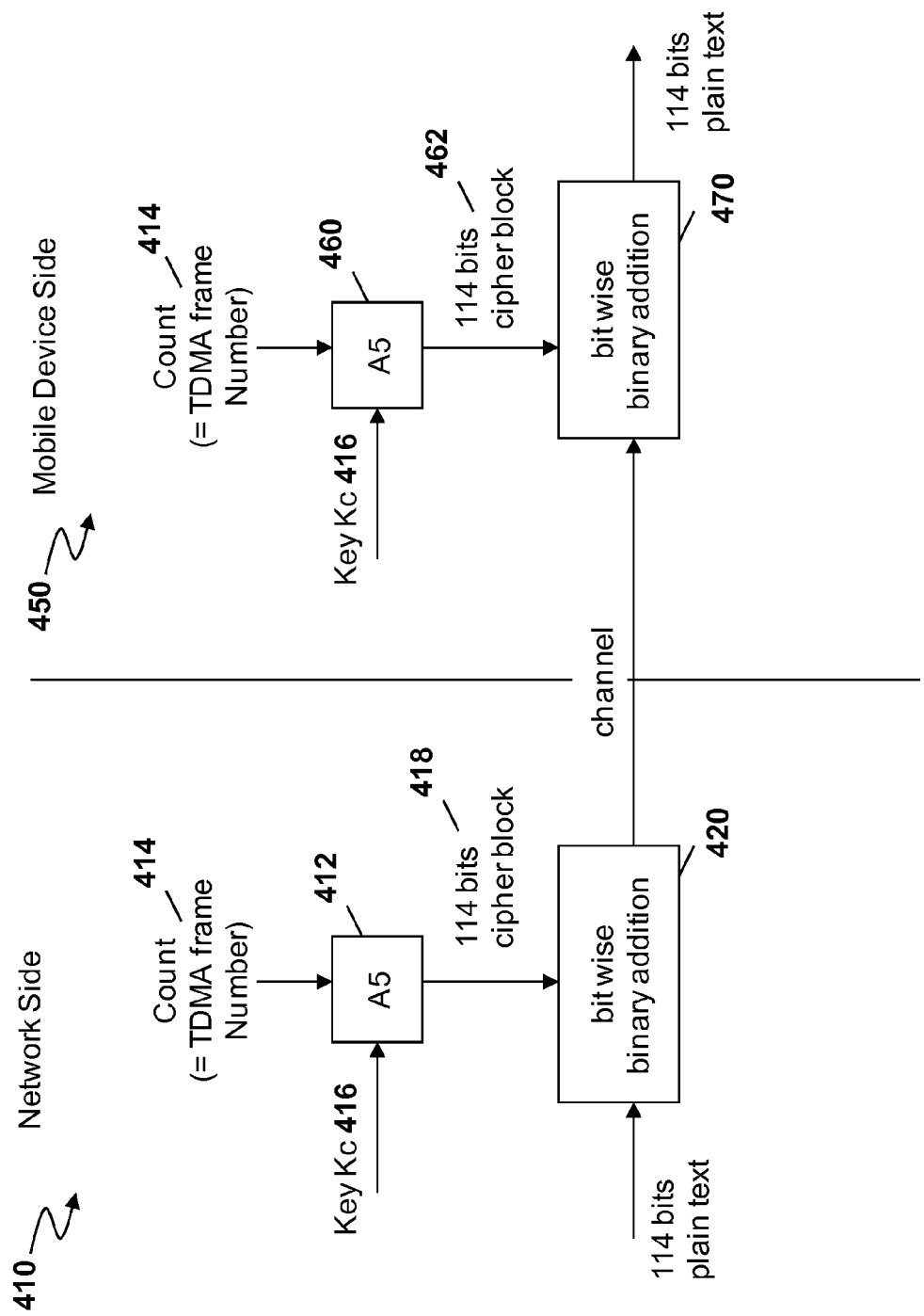
FIG. 4 is a block diagram showing encryption and decryption of a SACCH message using the A5 algorithm.

To provide further context, reference is now made to FIG. 4, which shows the encryption between the burst 250 and encrypted burst 260 from FIG. 2, and also shows decryption.

In particular, in FIG. 4, network side 410 includes an A5 block 412, which has as inputs a time division multiple access (TDMA) frame number 414 along with an encryption key 416. In case of the A5/1 algorithm, the encryption key is 64 bits long. The output of block 412 is a 114 bit cipher block 418, which is provided to bit wise binary addition block 420.

114 bits of plain text (for example burst 250 from FIG. 2) are then input to block 420. Block 420 does a bit-wise binary addition and produces an output, which may be burst 260 from FIG. 2.

The output from block 420 is then modulated and transmitted over the air and received on mobile device side 450.

Mobile device side 450 also has an A5 block 460, which has, as inputs, the TDMA frame number 414 along with the encryption key 416. Block 460 produces a 114 bit cipher block 462, which forms a first input to bit wise binary addition block 470.

A bit wise binary addition is performed at block 470 with the burst received over the air and the result is 114 plain text bits that should be identical to the burst input to block 420.

Knowledge of the entire plain text is known to result in a good chance of successful attack. The attacker may rely on the fact that transmissions 322 and 322' in FIG. 3 are unciphered and ciphered (respectively) versions of the same message.

Existing techniques for overcoming the potential vulnerability in the A5/1 encryption include the use of a stronger A5/3 and A5/4 encryption. These encryption standards are already standardized in GSM and may be supported by more recent mobile stations. However, the majority of GSM networks currently use A5/1 and this is likely to remain so for some time in the future, since network operators may need to upgrade hardware to support the stronger encryption.

Other prior techniques to decrease the vulnerability of prior SACCH signaling to plain text attacks include removing encryption on SACCH control messages. However, three problems exist with removing encryption in accordance with these prior techniques. A first is that legacy mobile devices expect the SACCH message to be encrypted and, thus, would fail to appropriately receive unencrypted SACCH messages. As such, removing encryption on the SACCH is not backwards compatible and cannot solve the problems for legacy mobiles in the field. Second, certain short message service (SMS) messages are sent over SACCH during the call and these would need to be encrypted for privacy reasons. If SACCH messages carrying SMS are encrypted then the mobile device may have to blindly determine whether or not each received SACCH block in the downlink is actually encrypted or not, or additional signaling may need to be provided. This increases the complexity at the mobile station. Third, not encrypting SACCH in the downlink may render the SACCH contents open for a "man in the middle" type of attack where a hostile device could broadcast the (unciphered) SACCH messages with contents so as to negatively impact the cell performance.

Yet another prior technique to decrease the vulnerability of prior SACCH signaling to a plain text attack is to provide randomization within sub-block 110, as described in PCT application number PCT/US11/24893, the contents of which are incorporated herein by reference.

Yet other prior techniques involve varying the format of the System Information 5, 5bis or 5ter message content sent on the SACCH. System Information 5, 5bis or 5ter messages may be sent on the SACCH for informing the mobile devices of the BCCH frequencies of the neighbor cells used in an operator's network. Apart from layer 3 header components, each of these system information messages includes a single information element containing the neighbor cells information. This is known as the BCCH frequency list.

For example, some prior techniques provide pseudo-randomization or scrambling of certain contents within the layer 2 or layer 3 sub-block 130, which can include the System Information 5, 5bis or 5ter message content sent on the SACCH. With regard to pseudo-randomization, one such prior technique includes pseudo-randomly cycling through different suitable range formats of neighbor cell descriptions and/or using a variable bit map format with a different origin absolute radio frequency channel number (ARFCN) in successive transmissions, provided that the origin ARFCN is not a real broadcast control channel (BCCH) carrier.

The neighbor cells ARFCNs may be coded according to a number of different formats. These include, bitmap 0; 1024 range; 512 range; 256 range; 128 range; and variable bitmap.

The choice of given format to encode the set is determined by the network depending, among other factors, on the number and absolute values of the ARFCNs to be encoded, and on the range of the ARFCNs to be encoded span.

It will be appreciated by those skilled in the art having regard to the above, for a given set, some formats may not be appropriate. For example, bitmap 0 only allows encoding of GSM900 ARFCNs. The range 256 is not suitable for encoding ARFCNs spanning over a range greater than 256 (modulo 1024). Further, variable bitmaps may not be suitable for encoding ARFCNs spanning over a range greater than 112 (modulo 1024). Also, not more than 22 ARFCNs can be encoded using the range 256 in a single message. Other examples of inappropriate formats would be known to those in the art.

In principle, for a given set of ARFCNs to be encoded, the network may select the most efficient coding format within the ones which are suitable. However, typically the coding format is unchanged for all transmissions of a given message.

One prior solution is, therefore, the pseudo randomization of contents of the System Information 5, 5bis or 5ter messages (also referred to herein as S15 messages).

Figure 5:
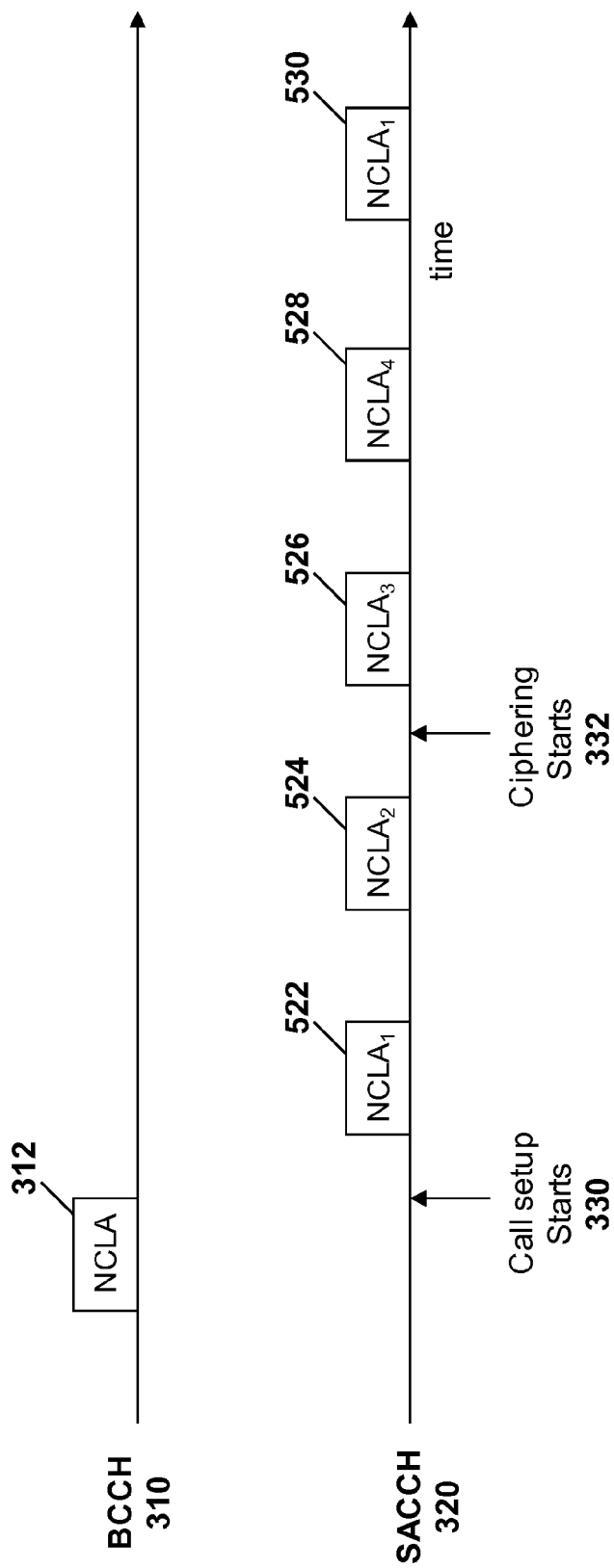
FIG. 5 is a block diagram showing a prior technique for sending neighbor cell information using a varied format for each message on the SACCH.

One such prior technique is described, for example, in Vodafone, "*Additional A5/1-GEA1 Attack Countermeasures*", 3GPP GP-101243, 2010-08-30 to 2010-09-03. Reference is now made to FIG. 5, which illustrates this prior technique.

In the prior technique illustrated in FIG. 5, BCCH 310 still sends a neighboring cell information message 312.

Further, in the illustrated prior technique of FIG. 5, SACCH 320 sends the neighboring cell information messages having neighboring cell descriptions with a different suitable range format. In particular, the network pseudo-randomly cycles through the different suitable range formats for the neighbor cell descriptions. In addition, or alternatively, a variable bit format may be used with different origin ARFCN in successive transmissions, provided that the origin ARFCN is not a BCCH carrier. Thus, in the prior technique of FIG. 5, the first neighboring cell information block 522 differs from second neighboring cell information block 524, which differs from third neighboring cell information block 526, which differs from the fourth neighboring cell information block 528.

A fifth block 530 is the same as information block 522, only now it is ciphered. This leads to a potential attack based on blocks 522 and 530.

The transmission of S15 on the SACCH may cycle through the neighboring cell information blocks in a pseudo-random pattern up to the maximum number of range formats.

As will be appreciated by those skilled in the art, mobile devices may be impacted when the ARFCNs list coding formats change frequently. In particular, if the ARFCN lists include random frequencies not used in the operator's network, this may require a recurring rebuild of the BCCH frequency list, extra frequency look ups requiring synthesizer tuning, base station identity code (BSIC) checks and frequency measurements, risks of inconsistent neighbor cell ranking in the measurement reports and it may be impossible for the mobile device to distinguish between different list versions broadcast by the network.

Another prior technique involves the scrambling (or partial scrambling) of content in the System Information 6 message, which could be implemented in conjunction with the proposal for SI5 described above. The padding bits in the message may be randomized to produce a different message. Alternatively, random fill bits may be introduced in the System Information 6 message. Further, some fields not used by a mobile device may be scrambled.

However, the alteration of spare padding bits reduces the number of bits that are available for future use and also there is a risk that the padded bits could be decoded for some reason and cause unpredictable behavior on mobile devices.

Figure 6:
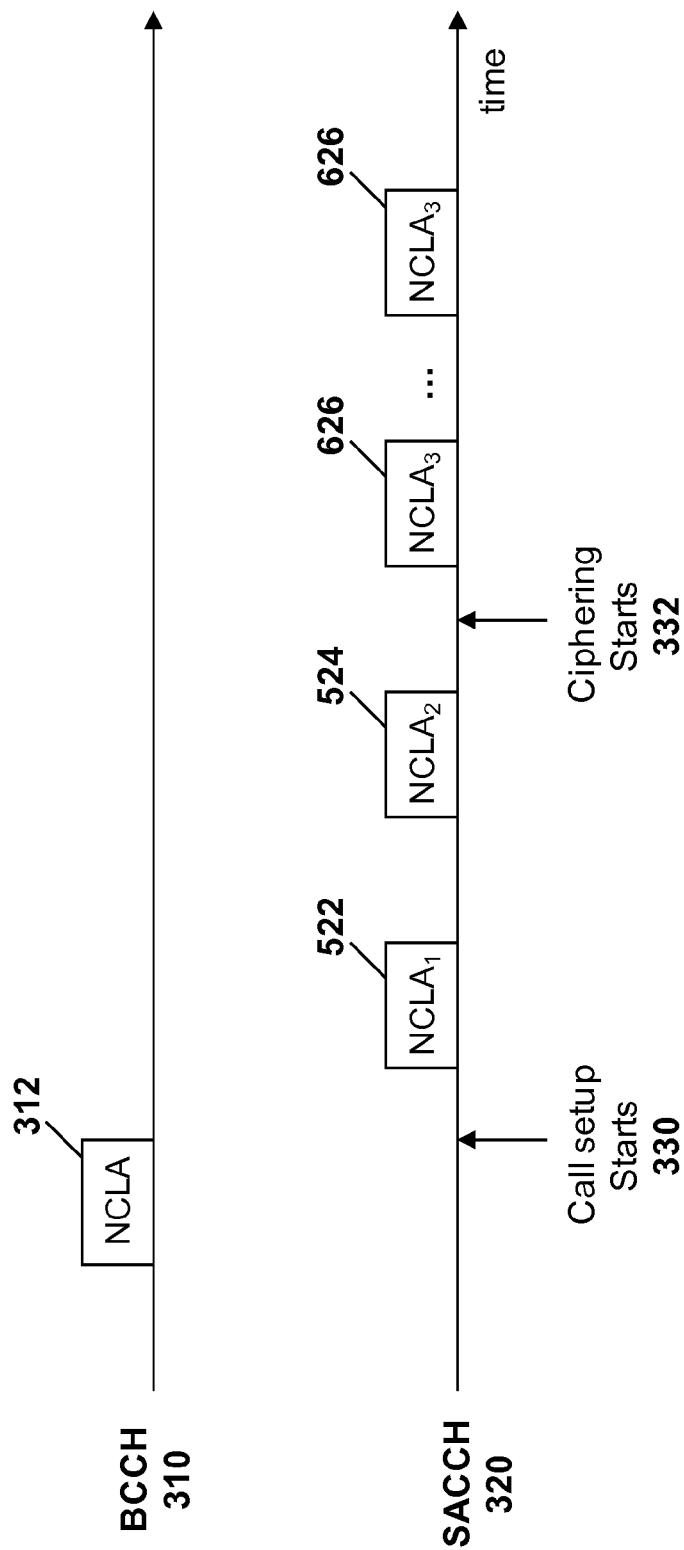
FIG. 6 is a block diagram showing a first example disclosed SACCH signaling technique involving sending different variants of a same type of message on the SACCH before and after ciphering.

Reference is now made to FIG. 6, which shows a first example disclosed SACCH signaling technique that can overcome at least some of the deficiencies of the prior techniques described above. In the example of FIG. 6 the BCCH 310 communicates neighbor cell information in message 312.

Further, SACCH 320 signals neighbor cell information in messages 522 and 524 between call set-up start time 330 and ciphering start time 332. Messages 522 and 524 may correspond to message variants having the same format or having differing formats. In other words, messages 522 and 524 may be different variants (e.g., having different formats, as described in greater detail below) of the same type of message (e.g., containing the same type of neighbor cell information).

After ciphering start time 332, neighbor cell information is provided for a significant period of time in messages 626. As used herein, "significant period of time" may, but does not necessarily, cover the entire call duration. Further, the "significant period of time" may refer to the time duration that is equal to or greater than the duration for which legacy devices are capable of storing soft SACCH bits from previous frames.

From FIG. 6, the variant of (or, in other words, the message format for) messages 626 differs from the message variants for messages 522 and 524 (e.g., which may all be the same type of message, such as a System Information 5, 5bis or 5ter message containing neighbor cell information) and further differs from the variant of (or, in other words, the message format for) message 312 on BCCH 310 (e.g., which may be another type of message, such as a System Information 2, 2bis or 2ter message also containing neighbor cell information). As such, in some embodiments, the variant(s) (e.g., format(s)) of messages which are ciphered when transmitted are different from the variant(s) (e.g., format(s)) of the same or similar types of messages (e.g., containing substantially similar information) which are sent unciphered.

Figure 7:
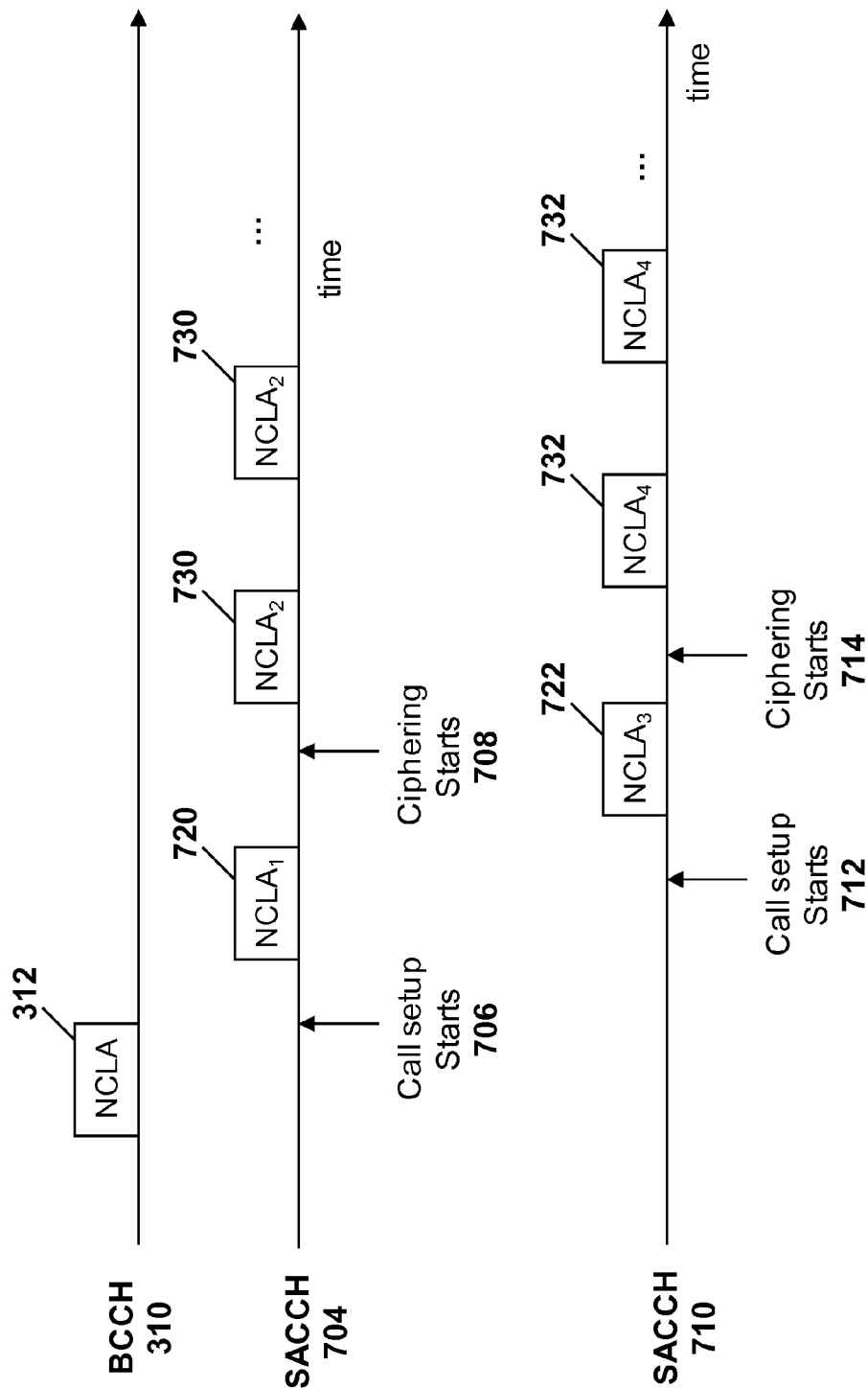
FIG. 7 is a block diagram showing a second example disclosed SACCH signaling technique involving sending different variants of a same type of message on different SACCHs corresponding to different mobile devices.

Reference is now made to FIG. 7, which illustrates a second example SACCH signaling technique disclosed herein. In the illustrated example, the message variant(s) used for system information messages directed to one mobile device is(are) different for the message variant(s) used for system information messages directed at a second mobile device. Generally, in some examples, the variant(s) (e.g., format(s)) of messages which are ciphered when transmitted to a first mobile device are different from the variant(s) (e.g., format(s)) of the same or similar types of messages (e.g., containing substantially similar information) which are sent unciphered, and are also different from the variant(s) (e.g., format(s)) of these same or similar types of messages which are ciphered when transmitted to a second mobile device Turning to the illustrated example of FIG. 7, BCCH 310 sends a neighbor cell information message 312. Further SACCH 704 is a point-to-point channel between a network element and a first mobile device. SACCH 704 has a call setup start time 706, after which a system information message providing neighbor cell information is shown as message 720.

Subsequent to the sending of message 720, ciphering starts at time 708.

Subsequent to ciphering start time 708, neighbor cell information messages 730 (e.g., of a same type as message 72-, such as a System Information 5, 5bis or 5ter message) are sent on SACCH 704 to the first mobile device. Similar to the solution of FIG. 6 above, messages 730 are a different message variant (e.g., format) relative to message 720 and 312, although these messages may all convey similar neighbor cell information.

A second SACCH 710 provides communication between a network element and a second mobile device. On SACCH 710 the call setup starts at time 712. Neighbor cell information is sent in message 722, which corresponds to a third message variant (e.g., format) that may be different from the message variants used for messages 720, 730 and 312, although all of these messages may contain similar neighbor cell information.

Subsequent to the sending of message 722 ciphering starts at time 714.

After ciphering starts, neighbor cell information is sent in messages 732, which corresponds to a fourth message variant (e.g., format) that may be different from the message variants used for messages 720, 722, 730 and 312, although all of these messages may contain similar neighbor cell information.

In some examples, the message variant (e.g., format) for message 720 may be the same or different from the message variant (e.g., format) for message 722. In any case, the variants (e.g., formats) for messages 720 and 722 differ from the variants (e.g., format) of messages 730 and 732.

Further, the variant (e.g., format) for message 732 differs from the variant (e.g., format) for message 730.

In addition, in some examples, the number of variants (e.g., formats) used for messages which are ciphered when transmitted to a given mobile station is significantly less than the number of distinct variants (e.g., formats) that can be used in the cell, and may be equal to 1.

The use of different variants (e.g., formats) for signaling neighbor cells to different mobile devices as illustrated in the example of FIG. 7 provides additional security since an attacker cannot simply listen to SACCH messages in a cell for an extended period using a device capable of deciphering and exposing (e.g. storing, displaying or otherwise communicating) the deciphered message and, hence, derive all of the various message variants (e.g., formats) used in a particular cell. In contrast, the prior technique of FIG. 5 cycles through the various message variants (e.g., formats) and, thus, an attacker can receive the neighbor cell messages in all the possible variants (e.g., formats) within the single call. Also the prior technique of FIG. 5 may use some of the message variants (e.g., formats) in an unencrypted state prior to the cipher key being established and an attacker may then simply try such message variant(s) as the basis for a known plaintext attack on received ciphered messages to obtain the cipher key and/or other details relating to the cipher procedure without the need to obtaining/determining the deciphered contents of ciphered SACCH messages in the cell.

Conversely, the messaging of the disclosed example of FIG. 7 provides for different message variants (e.g., formats) for different mobile devices, which makes it more difficult for an attacker to perform a plain text attack. For example, an attacker may receive only a single (ciphered) message variant (e.g., format) of a given system information block on a particular mobile device and, thus, will not be able to use the information derived from the mobile device to attack the second mobile device.

In some examples disclosed herein, the selection of a message variant (e.g., format) for a mobile device is done in a pseudo-random manner and may be based either on a mobile device's or subscriber's identity, the cell identifier or any other available device or subscriber parameter. In some examples, message variant (e.g., format) selection is constant for a given mobile device or subscriber (which may correspond to a SIM card) on a given cell, making it more difficult for an attacker to obtain multiple variants (e.g., formats) of messages (which may otherwise be possible by making multiple calls within a cell using the same device/SIM card) and, hence, perform a plain text attack and/or for the attacker to use a single message variant (e.g., format) as the basis for an attack by trying multiple SACCH blocks transmitted to the target mobile.

Figure 8:
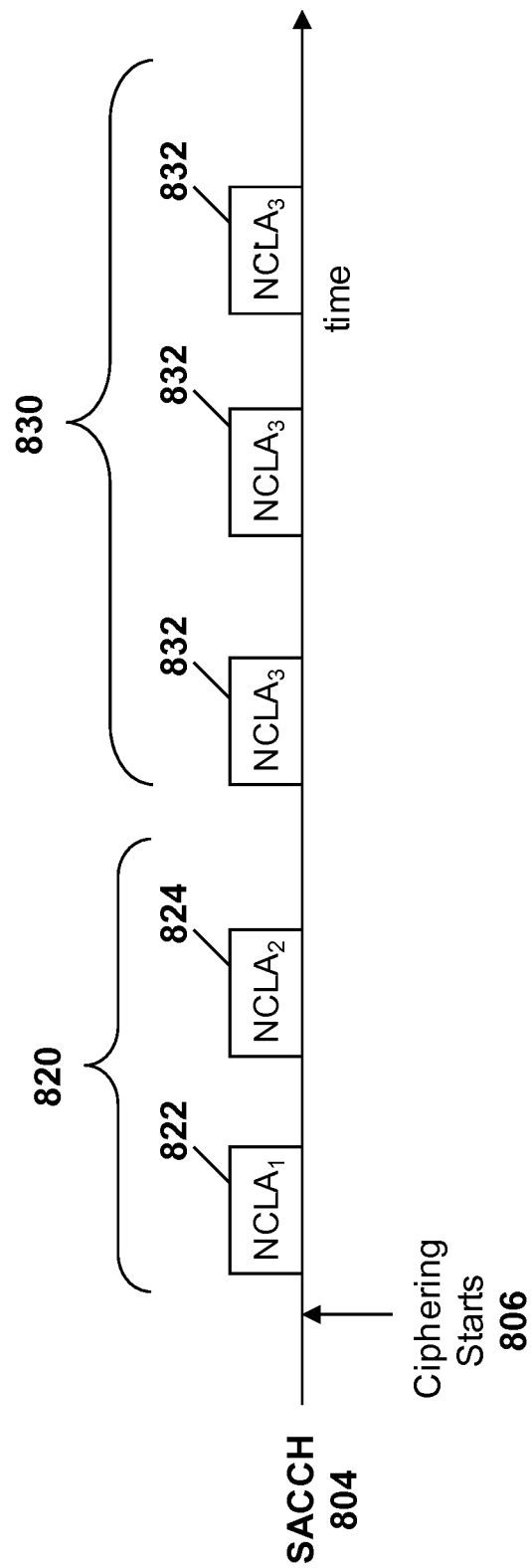
FIG. 8 is a block diagram showing a third example disclosed SACCH signaling technique involving using different variants of a same type of message during initialization and stable periods after ciphering starts.

Reference is now made to FIG. 8, which illustrates a third example SACCH signaling technique disclosed herein. In some examples, an initialization period may be desired prior to using a "stable" message variant (e.g., format) for a particular type of message to be sent on the SACCH (e.g., such as a System Information 5, 5bis or 5ter message containing neighbor cell information). FIG. 8 illustrates such an example. In the illustrated example of FIG. 8, ciphering starts at time 806 on SACCH 804. During the initialization period 820, neighbor cell information messages 822 and 824 are sent using the same or different message variants (e.g., formats).

After the initialization period 820 ends and a stable period 830 starts, neighbor cell information messages 832 are provided. The message variant (e.g., format) used for messages 832 differs from the variant (e.g., format) used for messages 822 and 824.

Figure 9:
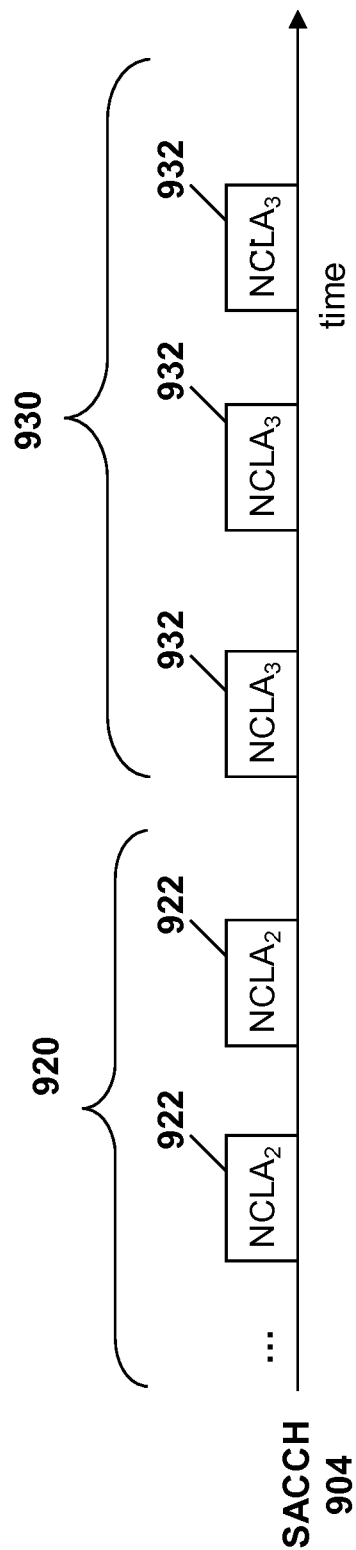
FIG. 9 is a block diagram showing a fourth example disclosed SACCH signaling technique involving varying the message variants used to send messages contained in different stable sets on the SACCH.

FIG. 9 illustrates a fourth example SACCH signaling technique disclosed herein. Referring to FIG. 9, in some examples it may be desirable to have a small subset of message variants (e.g., formats) for a particular mobile device. For particular type(s) of messages, the subset of message variants (e.g., formats) could be cycled through randomly or pseudo-randomly after a certain stable time period has expired. For example, in FIG. 9, during a stable time period 920, messages 922 are sent on SACCH 904 using a first message variant (e.g., format). Once stable time period 920 has ended and stable time period 930 starts, messages 932 are sent using a second message variant (e.g., format).

As used above, the terms "variant" and "format" are generally equivalent and refer to any modification of messages used to transmit substantially the same upper layer information. The upper layer information may include neighbor cell information, parameters related to network capabilities, parameters describing how the mobile should behave in the cell, among others.

Different message variants or formats may be derived from any one or more of the following: varying upper layer encoding such as described above; varying unused or spare bits; varying layer one header information; or introducing, removing or varying unnecessary, irrelevant or redundant information.

Generally, to determine different message variants, it is not necessary that the entire bit-level SACCH block is varied from one format to another but typically a significant number of bits should be different so that after fire coding, convolutional coding and burst mapping, long sequences of bits common to messages using different formats are avoided.

In existing 3GPP-compliant systems, scheduling of System Information messages is typically fixed. In particular, communication to a both first mobile device and to a second mobile device may have a schedule where (for example) every third block is a system information 5 message. This common scheduling can be derived on the mobile device used by an attacker and may thereafter be used to attack the second (target) mobile device.

In some disclosed examples, the scheduling of System Information messages may be changed once ciphering begins. Alternatively, the change in scheduling of System Information messages may differ between mobile devices to make the determination of the scheduling difficult to determine.

For example, while the above disclosed example SACCH signaling techniques can provide for the use of different message variants for System Information 5 messages sent on a SACCH block or, in other words, the variation of the format of a System Information 5 message on a SACCH block, an attacker may nevertheless know when an alternate message variant for a block is sent. The use of different message variants (e.g., formats) may be sufficient to address the flaws in prior systems since it will be difficult to provide a plain text attack on the variants. However, in some cases the message variants may be cycled and/or the set of message variants may be finite and deterministic, predictable or otherwise available and, thus, the attacker could focus on that block and use knowledge that it must contain one of a finite number of known variants.

By changing the scheduling of System Information messages after ciphering, an attacker will not know what the message variant is, nor will the attacker know which scheduling block to look in.

Based on the above, the example SACCH signaling techniques disclosed herein can ensure that information that is sent unciphered is not repeated within the ciphered state. Further, in at least some examples, the same ciphered information is not sent to all mobile devices.

In some example SACCH signaling techniques disclosed herein, the scheduling of some information may vary from mobile device to mobile device. Furthermore, in some disclosed examples, both the scheduling of messages and the format of such messages varies from device to device.

The example SACCH signaling techniques disclosed herein are backward compatible. The example SACCH signaling techniques disclosed herein could be implemented in a proprietary fashion by different vendors or may otherwise vary in actual deployment (e.g. by variation between operators), making it difficult for an attacker to determine variants since each vendor may implement a different strategy to determine exactly the ciphered system information message contents.

Figure 10:
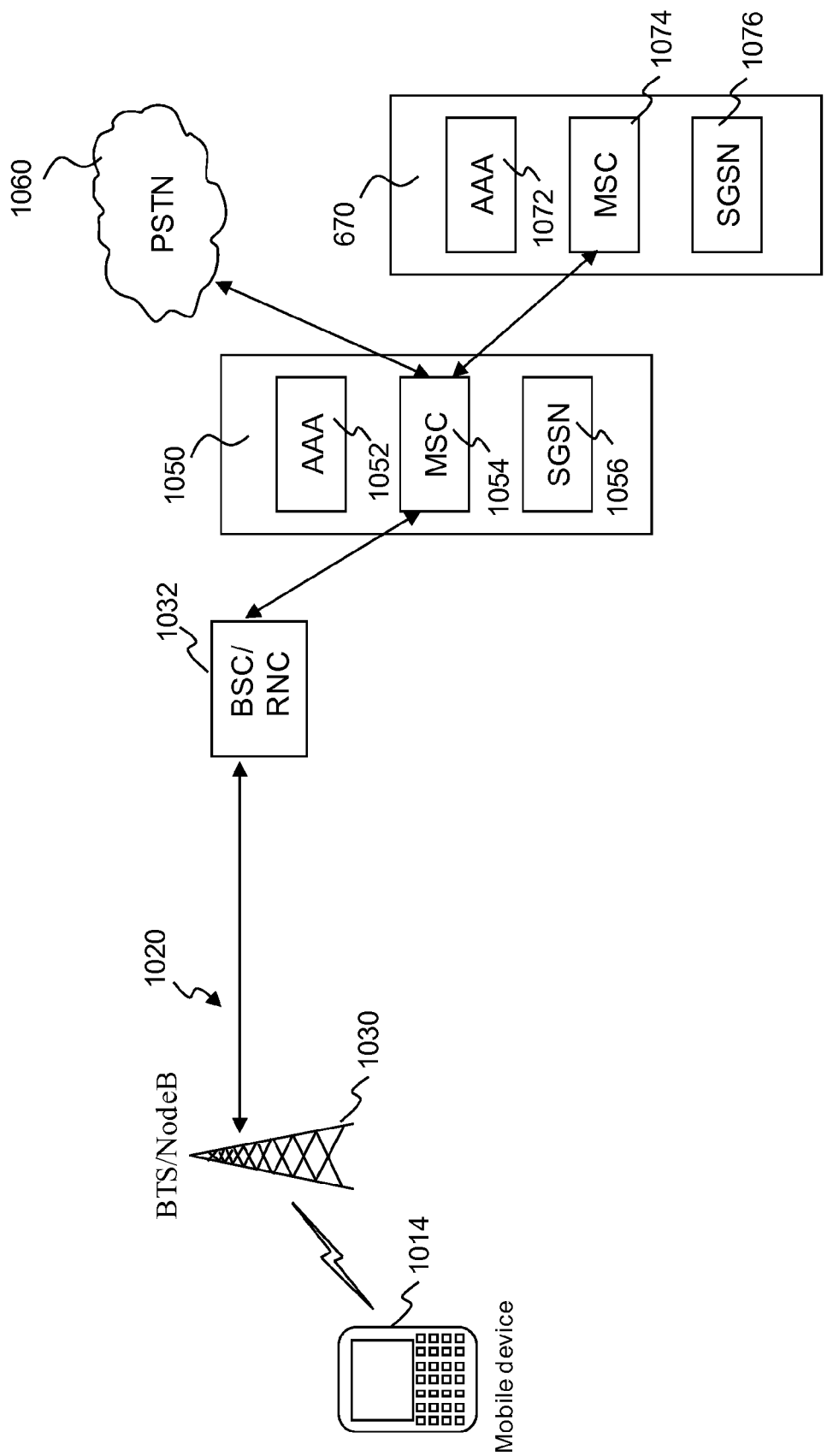
FIG. 10 is a block diagram showing an exemplary network architecture.
Figure 11:
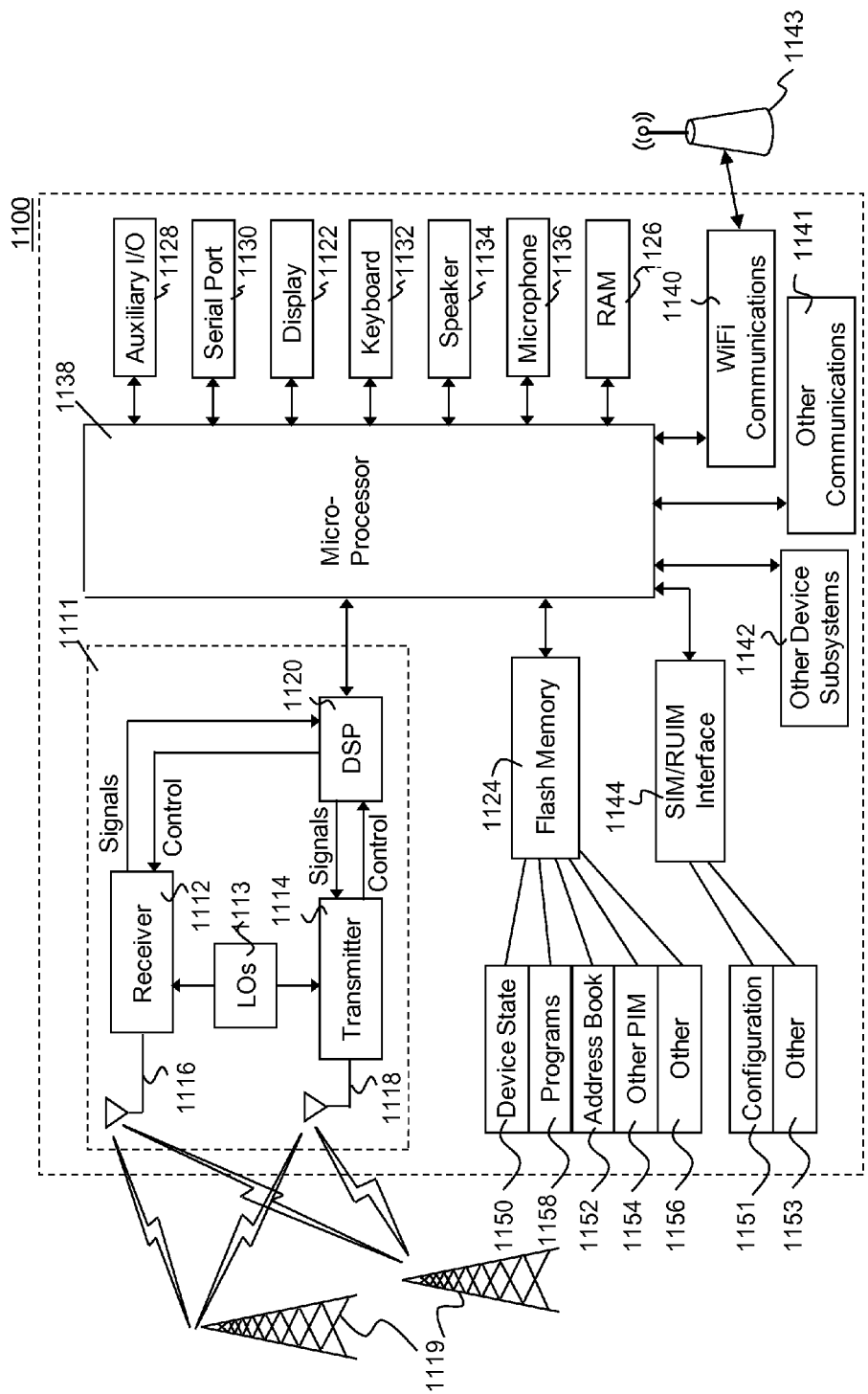
FIG. 11 is a block diagram of an exemplary mobile device.

The example SACCH signaling techniques illustrated in FIGS. 6 to 9 can be performed by any network element. As used herein, a network element can be a network side server or a mobile device. Reference is now made to FIGS. 10 and 11, which show exemplary network and mobile device architectures.

FIG. 10 illustrates an architectural overview for an exemplary network. A mobile device 1014 is configured to communicate with cellular network 1020.

Mobile device 1014 may connect through cellular network 1020 to provide either voice or data services. As will be appreciated, various cellular networks exist, including, but not limited to, global system for mobile communication (GSM), general packet radio service (GPRS), code division multiple access (CDMA), universal mobile telecommunications system (UMTS), and wideband code division multiple access (WCDMA), among others. These technologies allow the use of voice, data or both at one time.

Cellular network 1020 comprises a base transceiver station (BTS)/Node B 1030 which communicates with a base station controller (BSC)/Radio Network Controller (RNC) 1032. BSC/RNC 1032 can access the mobile core network 1050 through either the mobile switching center (MSC) 1054 or the serving GPRS switching node (SGSN) 1056. MSC 1054 is utilized for circuit switched calls and SGSN 1056 is utilized for data packet transfer. As will be appreciated, these elements are GSM/UMTS specific, but similar elements exist in other types of cellular networks.

Core network 1050 further includes an authentication, authorization and accounting module 1052 and can further include items such as a home location registry (HLR) or visitor location registry (VLR).

MSC 1054 connects to a public switched telephone network (PSTN) 1060 for circuit switched calls. Alternatively, for mobile-to-mobile calls the MSC 1054 may connect to an MSC 1074 of core network 1070. Core network 1070 similarly has an authentication, authorization and accounting module 1072 and SGSN 1076. MSC 1074 could connect to a second mobile device through a base station controller/node B or an access point (not shown). In a further alternative embodiment, MSC 1054 may be the MSC for both mobile devices on a mobile-to-mobile call.

In accordance with the present disclosure, any network element, including mobile device 1014, BTS 1030, BSC 1032, MSC 1052, and SGSN 1056 could be used to perform the methods of FIGS. 6 to 9. In general, such network element will include a communications subsystem to communicate with other network elements, a processor and memory which interact and cooperate to perform the functionality of the network element.

Further, if the network element is a mobile device, any mobile device may be used. One exemplary mobile device is described below with reference to FIG. 11. The use of the mobile device of FIG. 11 is not meant to be limiting, but is provided for illustrative purposes.

Mobile device 1100 is a two-way wireless communication device. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1100 is enabled for two-way communication, it can incorporate a communication subsystem 1111, including both a receiver 1112 and a transmitter 1114, as well as associated components such as one or more, antenna elements 1116 and 1118, local oscillators (LOs) 1113, and a processing module such as a digital signal processor (DSP) 1120 The particular design of the communication subsystem 1111 depends upon the communication network in which the device is intended to operate.

When required network registration or activation procedures have been completed, mobile device 1100 may send and receive communication signals over the network 1119. As illustrated in FIG. 11, network 1119 can comprise of multiple base stations communicating with the mobile device.

Signals received by antenna 1116 through communication network 1119 are input to receiver 1112, which may perform such common receiver functions as signal amplification, frequency down conversion, filtering, channel selection and the like, and in the example system shown in FIG. 11, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network access requirements will also vary depending upon the type of network 1119. In some networks, network access is associated with a subscriber or user of mobile device 1100. A mobile device may require a removable user identity module (RUIM) or a subscriber identity module (SIM) card in order to operate on a network. The SIM/RUIM interface 1144 is normally similar to a card-slot into which a SIM/RUIM card can be inserted and ejected. The SIM/RUIM card holds many key configurations 1151, and other information 1153 such as identification, and subscriber related information.

Mobile device 1100 includes a processor 1138 which controls the overall operation of the device. Communication functions, including at least data and voice communications, are performed through communication subsystem 1111. Processor 1138 also interacts with further device subsystems such as the display 1122, flash memory 1124, random access memory (RAM) 1126, auxiliary input/output (I/O) subsystems 1128, serial port 1130, one or more keyboards or keypads 1132, speaker 1134, microphone 1136, other communication subsystem 1140 such as a short-range communications subsystem and any other device subsystems generally designated as 1142. Serial port 1130 could include a USB port or other port known to those in the art.

Some of the subsystems shown in FIG. 11 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the processor 1138 can be stored in a persistent store such as flash memory 1124, which may instead be a read-only memory (ROM) or similar storage element (not shown). Specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate each program can allocate a portion of flash memory 1124 for their own data storage requirements. Processor 1138, in addition to its operating system functions, can enable execution of software applications on the mobile device. A predetermined set of applications which control basic operations, including at least data and voice communication applications for example, will normally be installed on mobile device 1100 during manufacturing. Other applications could be installed subsequently or dynamically.

A software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application can have the ability to send and receive data items, via the wireless network 1119. In an embodiment, the PIM data items are seamlessly integrated, synchronized and updated, via the wireless network 1119, with the mobile device user's corresponding data items stored or associated with a host computer system. Further applications may also be loaded onto the mobile device 1100 through the network 1119, an auxiliary I/O subsystem 1128, serial port 1130, short-range communications subsystem 1140 or any other suitable subsystem 1142, and installed by a user in the RAM 1126 or a nonvolatile store (not shown) for execution by the microprocessor 1138. Such flexibility in application installation increases the functionality of the device and may provide enhanced on-device functions, communication-related functions, or both.

In a data communication mode, a received signal such as a text message or web page download will be processed by the communication subsystem 1111 and input to the microprocessor 1138, which further processes the received signal for element attributes for output to the display 1122, or alternatively to an auxiliary I/O device 1128.

A user of mobile device 1100 may also compose data items such as email messages for example, using the keyboard 1132, which can be a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile device 1100 is similar, except that received signals would be output to a speaker 1134 and signals for transmission would be generated by a microphone 1136. Alternative voice or audio I/O subsystems, such as a voice message recording subsystem, may also be implemented on mobile device 1100. Although voice or audio signal output is accomplished primarily through the speaker 1134, display 1122 may also be used to provide an indication of the identity of a calling party, the duration of a voice call, or other voice call related information for example.

Serial port 1130 in FIG. 11 would normally be implemented in a personal digital assistant (PDA)-type mobile device for which synchronization with a user's desktop computer (not shown) may be desirable, but is an optional device component. Such a port 1130 would enable a user to set preferences through an external device or software application and would extend the capabilities of mobile device 1100 by providing for information or software downloads to mobile device 1100 other than through a wireless communication network. The alternate download path may for example be used to load an encryption key onto the device through a direct and, thus, reliable and trusted connection to thereby enable secure device communication. Serial port 1130 can further be used to connect the mobile device to a computer to act as a modem.

WiFi Communications Subsystem 1140 is used for WiFi Communications and can provide for communication with access point 1140.

Other communications subsystem(s) 1141, such as a short-range communications subsystem, are further components that may provide for communication between mobile device 1100 and different systems or devices, which need not necessarily be similar devices. For example, the subsystem(s) 1141 may include an infrared device and associated circuits and components or a Bluetooth™ communication module to provide for communication with similarly enabled systems and devices.

The embodiments described herein are examples of structures, systems or methods having elements corresponding to elements of the techniques of the present application. The above written description may enable those skilled in the art to make and use embodiments having alternative elements that likewise correspond to the elements of the techniques of the present application. The intended scope of the techniques of the above application thus includes other structures, systems or methods that do not differ from the techniques of the present application as described herein, and further includes other structures, systems or methods with insubstantial differences from the techniques of the present application as described herein. Furthermore, this patent covers all methods, apparatus/systems and articles of manufacture fairly falling within the scope of the appended claims either literally or under the doctrine of equivalents.

What is claimed is:

1. A method to secure communications in a network, the method comprising:
    determining a first variant of a message to be transmitted to a device, the first variant of the message being one of a plurality of possible variants of the message, the first variant of the message being determined based on an identifier associated with a cell identifier of the device;
    ciphering the first variant of the message to form a ciphered first variant of the message; and
    transmitting the ciphered first variant of the message to the device, wherein the message comprises neighbor cell information.

2. A method as defined in claim 1, wherein the plurality of possible variants of the message correspond to a plurality of possible formats for the message.

3. A method as defined in claim 1, wherein the first variant of the message is further determined based on an identifier associated with a subscriber identity module (SIM) card of the device.

4. A method as defined in claim 1, wherein the first variant of the message is transmitted to the device during a first time period, and further comprising:
    determining a second variant of the message, the second variant of the message being a second one of the plurality of possible variants of the message;
    ciphering the second variant of the message to form a ciphered second variant of the message; and
    after the first time period ends, transmitting the ciphered second variant of the message to the device.

5. A method as defined in claim 4, wherein the second variant of the message is determined based on the identifier associated with the device.

6. A method as defined in claim 4, further comprising:
    determining a third variant of the message, the third variant of the message being a third one of the plurality of possible variants of the message;
    ciphering the third variant of the message to form a ciphered third variant of the message; and
    after the second time period ends, transmitting the ciphered third variant of the message to the device.

7. A tangible machine readable storage device comprising machine readable instructions which, when executed, cause a machine to at least:
    determine a first variant of a message to be transmitted to a mobile station, the first variant of the message being one of a plurality of possible variants of the message, the first variant of the message being determined based on an identifier associated with a cell identifier of the mobile station;
    cipher the first variant of the message to form a ciphered first variant of the message; and
    transmit the ciphered first variant of the message to the mobile station, wherein the message comprises neighbor cell information.

8. A tangible storage device as defined in claim 7, wherein the plurality of possible variants of the message correspond to a plurality of possible formats for the message.

9. A tangible storage device as defined in claim 7, wherein the first variant of the message is further determined based on an identifier associated with a subscriber identity module (SIM) card of the mobile station.

10. A tangible storage device as defined in claim 7, wherein the first variant of the message is transmitted to the mobile station during a first time period, and the instructions, when executed, further cause the machine to:
   determine a second variant of the message, the second variant of the message being a second one of the plurality of possible variants of the message;
   cipher the second variant of the message to form a ciphered second variant of the message; and
   after the first time period ends, transmit the ciphered second variant of the message to the mobile station.

11. A tangible storage device as defined in claim 10, wherein the second variant of the message is determined based on the identifier associated with the mobile station.

12. A tangible storage device as defined in claim 10, wherein the instructions, when executed, further cause the machine to:
   determine a third variant of the message, the third variant of the message being a third one of the plurality of possible variants of the message;
   cipher the third variant of the message to form a ciphered third variant of the message; and
   after the second time period ends, transmit the ciphered third variant of the message to the mobile station.

13. An apparatus to secure communications in a network, the apparatus comprising:
   a processor to:
      determine a first variant of a message to be transmitted to a device, the first variant of the message being one of a plurality of possible variants of the message, the first variant of the message being determined based on an identifier associated with a cell identifier of the device; and
      cipher the first variant of the message to form a ciphered first variant of the message; and
   a transmitter to transmit the ciphered first variant of the message to the device, wherein the message comprises neighbor cell information.

14. An apparatus as defined in claim 13, wherein the plurality of possible variants of the message correspond to a plurality of possible formats for the message.

15. An apparatus as defined in claim 13, wherein the first variant of the message is further determined based on an identifier associated with a subscriber identity module (SIM) card of the device.

16. An apparatus as defined in claim 13, wherein:
   the processor is further to:
      determine a second variant of the message, the second variant of the message being a second one of the plurality of possible variants of the message; and
      cipher the second variant of the message to form a ciphered second variant of the message; and
   the transmitter is further to:
      transmit the first variant of the message to the device during a first time period; and
      transmit the ciphered second variant of the message to the device after the first time period ends.

17. An apparatus as defined in claim 16, wherein:
   the processor is further to:
      determine a third variant of the message, the third variant of the message being a third one of the plurality of possible variants of the message; and
      cipher the third variant of the message to form a ciphered third variant of the message; and
   the transmitter is further to transmit the ciphered third variant of the message to the device after the second time period ends.

* * * * *